United States Patent
Fan et al.

(10) Patent No.: US 7,800,779 B2
(45) Date of Patent: Sep. 21, 2010

(54) SYSTEM AND METHOD FOR IMAGE BASED CONTROL USING INLINE SENSORS

(75) Inventors: Zhigang Fan, Webster, NY (US); Lalit Keshav Mestha, Fairport, NY (US); Yao Rong Wang, Webster, NY (US); Shen-ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1308 days.

(21) Appl. No.: 11/314,104

(22) Filed: Dec. 21, 2005

(65) Prior Publication Data

US 2007/0139734 A1  Jun. 21, 2007

(51) Int. Cl.
- G06F 15/00 (2006.01)
- G06K 1/00 (2006.01)
- H04N 1/60 (2006.01)
- H04N 1/46 (2006.01)

(52) U.S. Cl. .......... 358/1.9; 358/504
(58) Field of Classification Search ............ 358/1.9, 358/1.2, 504, 1.1, 406
See application file for complete search history.

(56) References Cited

U.S. PATENT DOCUMENTS

| | | |
|---|---|---|
| 4,660,082 A | 4/1987 | Tomohisa et al. |
| 4,839,722 A | 6/1989 | Barry et al. |
| 5,018,008 A | 5/1991 | Asada |
| 5,212,546 A | 5/1993 | Arazi et al. |
| 5,448,277 A | 9/1995 | Long |
| 5,530,656 A | 6/1996 | Six |
| 5,619,427 A | 4/1997 | Ohkubo |
| 5,749,020 A | 5/1998 | Mestha et al. |
| 5,903,796 A | 5/1999 | Budnik et al. |
| 6,178,007 B1 | 1/2001 | Harrington |
| 6,384,918 B1 | 5/2002 | Hubble, III et al. |
| 6,404,920 B1 * | 6/2002 | Hsu .................... 382/190 |
| 6,538,770 B1 | 3/2003 | Mestha |
| 6,690,471 B2 | 2/2004 | Tandon et al. |
| 6,744,531 B1 | 6/2004 | Mestha et al. |
| 6,975,949 B2 | 12/2005 | Mestha et al. |
| 7,267,799 B1 * | 9/2007 | Borich et al. ........ 422/82.05 |
| 7,295,340 B2 | 11/2007 | Mestha et al. |
| 7,307,752 B1 | 12/2007 | Mestha et al. |
| 7,315,394 B2 | 1/2008 | Klassen et al. |

(Continued)

FOREIGN PATENT DOCUMENTS

EP  0747853  12/1996

(Continued)

OTHER PUBLICATIONS

Mestha et al.; U.S. Appl. No. 09/566,291, filed May 5, 2000; On-Line Calibration System for a Dynamically Varying Color Marking Device.

(Continued)

Primary Examiner—Douglas Q Tran
(74) Attorney, Agent, or Firm—Duane C. Basch; Basch & Nickerson LLP

(57) ABSTRACT

Disclosed are a system and method are directed to efficient image based color calibration and improving color consistency performance, and more particularly to the use of continuous or dynamic calibration performed during printing and enabling adjustment on a page by page basis.

20 Claims, 3 Drawing Sheets

U.S. PATENT DOCUMENTS

| | | |
|---|---|---|
| 7,333,208 B2 | 2/2008 | Mestha et al. |
| 7,375,851 B2 | 5/2008 | Mestha et al. |
| 7,376,272 B2 | 5/2008 | Fan et al. |
| 7,383,261 B2 | 6/2008 | Mestha et al. |
| 7,505,173 B2 | 3/2009 | Viturro et al. |
| 2004/0136013 A1 | 7/2004 | Mestha et al. |
| 2004/0141193 A1 | 7/2004 | Mestha et al. |
| 2004/0165199 A1 | 8/2004 | Klassen et al. |
| 2004/0252905 A1 | 12/2004 | Mizes et al. |
| 2005/0030560 A1 | 2/2005 | Maltz |
| 2005/0099446 A1 | 5/2005 | Mizes et al. |
| 2007/0139734 A1 | 6/2007 | Fan et al. |
| 2008/0037069 A1 | 2/2008 | Mestha et al. |

FOREIGN PATENT DOCUMENTS

| | | |
|---|---|---|
| EP | 0854638 | 7/1998 |

OTHER PUBLICATIONS

Mestha et al.; U.S. Appl. No. 11/170,946, filed Jun. 30, 2005; System and Method for Dynamically Generated Uniform Color Objects.

Viturro et al.; U.S. Appl. 11/170,928, filed Jun. 30, 2005; System and Method for Spatial Gray Balance Calibration Using Hybrid Sensing Systems.

Mestha, L.K.; U.S. Appl. 11/016,952, filed Dec. 20, 2004; Full Width Array Mechanically Tunable Spectrophotometer.

Mestha et al.; U.S. Appl. 10/248,387 filed Jan. 15, 2003; Systems and Methods for Obtaining a Spatial Color Profile, and Calibrating a Marking System.

An unofficial prosecution history of US patent 7505173.
An unofficial prosecution history of US patent 7376272.
An unofficial prosecution history of US patent 6975949.
An unofficial prosecution history of US patent 7333208.
An unofficial prosecution history of US patent 7375851.
An unofficial prosecution history of US patent 7307752.
An unofficial file wrapper for US Patent 7,315,394.
An unofficial file wrapper for US Patent 7,295,340.
An unofficial prosecution history of U.S. Appl. 11/170,946, filed Jun. 30, 2005.
Rosenfeld, A.C et al.; Digital Picture Processing; Ch. 6; Academic Press 1982.
Hunt, R.W.G.; The Reproduction of Colour; Fountain Press, England; CH 25, 26, 27, 28.

* cited by examiner

SYSTEM AND METHOD FOR IMAGE BASED CONTROL USING INLINE SENSORS

The disclosed system and method are directed to efficient image based color calibration and improving color consistency performance, and more particularly to the use of continuous or dynamic calibration performed during printing and enabling adjustment on a page by page basis.

CROSS-REFERENCE TO RELATED APPLICATIONS

Cross-reference is made to the following related patent applications, which are also hereby incorporated by reference for their teachings: U.S. application Ser. No. 09/566,291 by L. K. Mestha, for an ON-LINE CALIBRATION SYSTEM FOR A DYNAMICALLY VARYING COLOR MARKING DEVICE, filed on May 5, 2000; U.S. Patent Publication 20040165199, for a "CALIBRATION METHOD FOR AN IMAGING DEVICE," by R. Victor Klassen, et al., published Aug. 26, 2004; U.S. application Ser. No. 11/170,946 for a "SYSTEM AND METHOD FOR DYNAMICALLY GENERATED UNIFORM COLOR OBJECTS," by Lalit K. Mestha et al., filed Jun. 30, 2005; and U.S. application Ser. No. 11/170,928 for a "SYSTEM AND METHOD FOR SPATIAL GRAY BALANCE CALIBRATION USING HYBRID SENSING SYSTEMS," by R. Enrique Viturro et al.

BACKGROUND AND SUMMARY

In many business applications, color documents have become essential as a component of communication. Color facilitates the sharing of knowledge and ideas. Companies involved in the development of color output devices continue to look for ways to improve the total image quality of such devices. One aspect that affects the perception of image quality is the consistent production of a quality image by a printer—from one document to the next, from one day to another, from one week to the next, etc. Users are accustomed to printers and copiers that produce high quality color and grayscale output. Users further expect to be able to reproduce a color image with consistent quality on any compatible output device, including another device within an organization, a device at home or elsewhere. Hence, there remains a commercial need for efficiently maintaining print color predictability and consistency.

Recently filed patent applications including U.S. Pat. No. 6,975,949 for a FULL WIDTH ARRAY SCANNING SPECTROPHOTOMETER by L. K. Mestha et al., awarded Dec. 13, 2005, and U.S. application Ser. No. 11/016,952 for a FULL WIDTH ARRAY MECHANICALLY TUNABLE SPECTROPHOTOMETER, by L. K. Mestha, filed Dec. 20, 2004, cover the use of two different types of full-width array (FWA) spectrophotometers to sense a full page. Both are also hereby incorporated by reference for their teachings. Similarly, U.S. application Ser. No. 10/248,387 for SYSTEMS AND METHODS FOR OBTAINING A SPATIAL COLOR PROFILE, AND CALIBRATING A MARKING SYSTEM, by L. K. Mestha et al., filed on Jan. 15, 2003, and also hereby incorporated by reference, shows an approach that utilizes a specially designed test pattern containing numerous patches, some of which are arranged side by side along the slow scan direction (y-direction) to obtain the gray tonal reproduction curves (TRCs).

Color printing customers not only require that their documents (images) are accurately reproduced in color, but also demand that the outputs do not vary over time. Color consistency, over time is often achieved or maintained by calibration. Most of the existing printer calibration methods are template based—meaning that they require the printer to print a set of test templates. The actual outputs are then measured and compared with the desired outputs to generate the error signal that drives the calibration process. The template-based approach is typically "offline" and "discrete" in nature. Thus, such an approach requires stopping the normal printing process. While this might not be particularly disturbing for short runs, where the calibration might be scheduled between print jobs, it is certainly an inconvenience and an impact to efficiency when a long run print job needs to be interrupted for calibration. Also, off-line calibration is a "discrete" event, meaning there is typically a significant time interval between two consecutive calibrations, where appreciable color error may accumulate during the period between calibrations.

Disclosed herein is a system and method to provide improved color consistency performance by calibration performed continuously in an on-line fashion for each page, yet using customer (print job) images. The disclosed method includes at least two phases, a training phase and a calibration phase. While the calibration is performed continuously during printing, the prior training phase is undertaken offline where the total color drift is modeled as a linear combination of a few Eigen functions. The resulting information is then used to dynamically control color drift of any image from page to page.

Instead of printing test templates, the disclosed system and method extracts calibration information from a plurality of image pages printed when inline sensors or spectrophotometers (full width/partial width/low cost light emitting diode (LCLED)) are used as measurement devices in the printing system. The calibration phase is "real time" and "continuous" and can use colors off the incidental patch areas of the print image directly. Also disclosed is a low-rank approximation method employed to increase the color consistency performance of the system when the measurements are made from incidental patch areas in the printed image. Advantages of the disclosed method include, among others, convenience to the customer (calibration is "embedded" in the printing process and undetected by users), and accuracy in calibration (calibration is performed continuously so that any color drift is compensated in a timely fashion and color variation is significantly reduced.)

A main difference between the template-based calibration and the image based approach is the number of measurements. In the template-based calibration since one can print as many patches as required and measured offline, it has a full control of the measuring points. The test templates are carefully designed to ensure they are capable of capturing and measuring errors in any part of the color space. In contrast, in the image based method, calibration information is extracted from the printed customer images, with randomly created measurement points at various locations in the image. Such measuring points are thus image dependent and the calibration system will have very limited control. A major challenge for the image based approach is to derive color shifts over the entire color space from the available, limited set of measurements, appearing at random times while running a print production job. Accordingly, the disclosed systems and methods are directed to efficiently calibrating color print engines for uninterrupted (continuous) service using inline sensors.

Disclosed in embodiments herein is a method for image based control, comprising: a training process, wherein a total color drift is modeled; and a calibration process performed continuously during completion of a printing job.

Also disclosed in embodiments herein is a method for controlling performance of an image output device, comprising: characterizing the variability of the image output device in terms of a model; periodically collecting data relating to a current state of the image output device; and applying the data to the model to determine an adjustment to be made to the image output device.

Further disclosed in embodiments herein is a system for image based color calibration, comprising: an image output device for rendering printed color documents in response to digital image data an initial configuration as processed by a digital front end processor operatively connected to the system; a memory for storing information characterizing the performance of the image output device; a color sensor suitable for detecting a color of an image deposited on the printed color documents and producing an output indicative of the color; and a calibration processor for receiving the output indicative of the color and, in conjunction with the information characterizing the performance of the image output device, producing a modified configuration for subsequent use in rendering the printed color documents.

DETAILED DESCRIPTION

Figure 1:
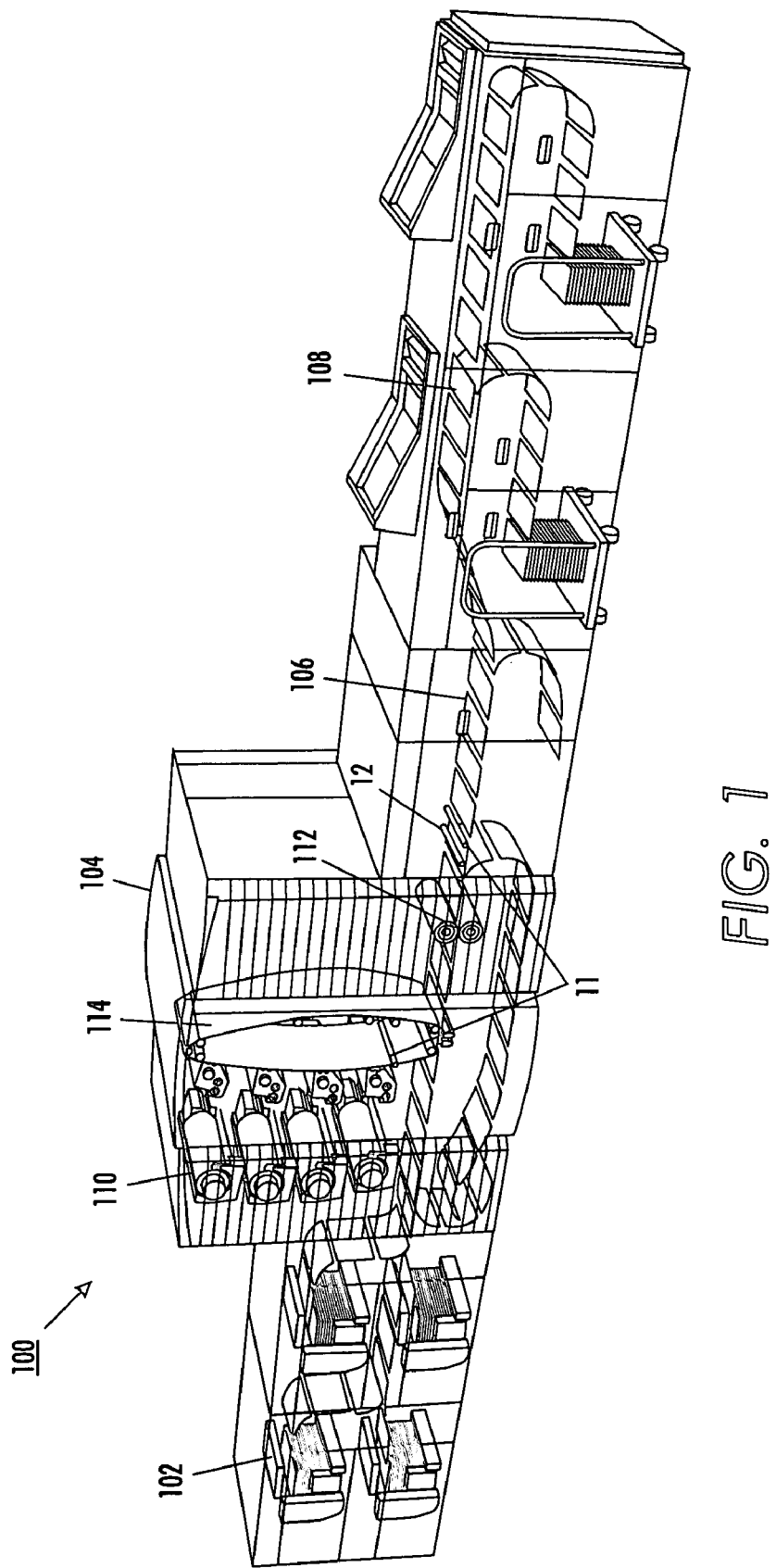
FIG. 1 is an exemplary mechanical embodiment for the disclosed system and method which includes an in-line full width array scanner and spectrophotometer.

The system and method will be described in connection with a preferred embodiment, however, it will be understood that there is no intent to limit the scope to the embodiment(s) described. On the contrary, the intent is to cover all alternatives, modifications, and equivalents as may be included within the spirit and scope of the appended claims. Referring now to the drawings, the figures show a method and apparatus for automatically calibrating a printing or similar output device. The present disclosure uses the term "calibration" to broadly cover the processing of level-3 or gray balance calibration or for generating multi-dimensional color management LUTs such as 4-4 or 3-4 profiles.

The disclosed method and system employ a combination of a full-width array (FWA) or similar page-scanning mechanism in conjunction with an on-line spectrophotometer color measurement system in the output path of a color printer for measuring colors (e.g., sheets of a printing job) without requiring manual operations or operator involvement for the calibration. The image based control system seeks to adjust color conversion tables and/or tonal reproduction values for one or more of the primary colors by detecting color patches or regions in an image being printed, measuring colors and automatically readjusting the color conversion tables and/or tone reproduction curves until a satisfactory level of accuracy is obtained. After calibration the control system returns adjusted color conversion tables and/or TRCs for use with the normal print path. The process is enabled either by the system controller or by a user with minimal interaction.

One possible embodiment for the disclosed system and method is depicted in FIG. 1, which shows the Xerox iGen3™ Digital Production Press. In the embodiment, a printer or similar output device 100 provides a xerographic printing system suitable for producing printed color documents in response to digital image data. Printer 100 operates under the control of a processor(s) and further includes a source of paper or printable substrates 102 that are operatively connected to a printing engine 104, and output path 106 and finisher 108. As illustrated, the print engine 104 is a multi-color engine having a plurality of imaging/development subsystems 110, that are suitable for producing individual color images (e.g., CMYK) on belt 114, where the belt then transfers the images to the substrate.

The printer comprises a marking device 104, 110, with an associated reflectance scanner 11 for sensing reflectance of a developed color region or patch. In one embodiment, scanner 11 may be an on-line full-width array scanner associated with a document path. Alternatively, as depicted in FIG. 1, scanner 11 may be a scanning array adjacent to a photoconductive or intermediate transfer medium, where the reflectance of a toner or similar marking material patch may be sensed. In other embodiments, scanning array 11 may be located on the output path 106, where the reflectance of the fused toner or similar marking material patch may be sensed. Marking device 104 further comprises a color sensing device 12, although the system and method are not restricted to marking devices alone and any image output/display system such as printers, monitors or other imaging devices may employ aspects of the disclosed system and method. It should be further appreciated that the signals produced by the aforementioned sensors, although characterized in a page-by-page manner, may be the result of sensing operations performed on different portions of a document or printed page, as well as on different pages.

In the depicted embodiment, the color sensing device 12 is a spectrophotometer. The spectrophotometer provides spectral information comprising a representative signal of the printed colors of the image and preferably comprises L*, a*, b* values, XYZ, etc., values depending on the desired color description. One such spectrophotometer may be that disclosed in U.S. Pat. No. 6,384,918 by Hubble, III et al. for a SPECTROPHOTOMETER FOR COLOR PRINTER COLOR CONTROL WITH DISPLACEMENT INSENSITIVE OPTICS, the disclosure of which is hereby incorporated by reference. The spectrophotometer is for non-contact measurement of colored target areas such as test patches on moving printed test sheets in an output path of a color printer, where test patches may be sequentially angularly illuminated with multiple different colors, and a photosensor providing electrical signals in response. The spectrophotometer includes a lens system for transmitting that reflected illumination (multiple illumination sources comprise approximately ten or more individual LEDs) from the test patch to the photosensor with a lens magnification ratio of approximately one to one. The exemplary spectrophotometer provides non-contact color measurements of moving color target areas variably displaced therefrom within normal paper-path baffle spacing.

A digital front end (DFE) associated with printer 100 controls the rendering of images in the printer and comprises a conventional image color separation path for processing an input image, as specified in device independent parameters, into CMYK printing parameters acceptable for rendering by the printer. For example, a three-dimensional (3-D) look-up table (LUT) may be used to transform the original image in device independent space (e.g., LAB) to CMY space. The CMY space is transformed to CMYK space by undercolor removal/gray component replacement. Linearization of a tonal reproduction curve (TRC) comprises a calibration and characterization process that is the subject of the present disclosure. The particular linearized signal resulting from the tonal reproduction curve is converted into a halftone image before actual printing by the marking device 110.

The disclosed embodiments extract calibration information from a plurality of, or even each, image page printed with inline sensors 11 (full width/partial width/LCLEDs) used as measurement devices in the printing system 100. The method is "real time" and "continuous" and can use colors off the image directly. The following description provides details of a low-rank approximation method employed with one embodiment to increase the color consistency performance of the system when the measurements are made from incidental patch areas in the image.

It will be appreciated that some or all of the following processes may be implemented in software operating on one or more processors of the printing system 100. In one embodiment, the processor 100 may include a dedicated calibration processor to continually monitor and adjust the operation of the printing system (and DFE) in accordance with the methods described herein. The advantages of such a technique are: i) convenience to the customer (calibration is embedded in the printing process and is undetectable by users and normal printing processes can continue to run uninterrupted); and ii) accuracy in calibration (calibration is performed continuously for each page and any color drift is timely compensated).

Although described with respect to a xerographic or electrostatic printing system for the production of documents, the methods described may be applied to various types of output devices. Moreover, the nature or type of substrate used in the printing process is not limited to paper, but may include photographic materials, textiles, ceramics and the like where color control is desired.

Details about how to extract incidental patch areas in a feed forward fashion when full width/partial width/LCLEDs spot spectrophotometers are used is disclosed U.S. Pat. No. 6,975, 949 for a "FULL WIDTH ARRAY SCANNING SPECTROPHOTOMETER," by Lalit (formerly Lingappa) K. Mestha, et al., awarded Dec. 13, 2005 and hereby incorporated by reference in its entirety. In one embodiment, the region may be low-pass filtered (8×8 pixel region) in order to assure consistency of color and the lack of any edges. A specific feature of the disclosed spectrophotometer is to provide a full width array spectrophotometer for full width scanning color analysis of a printed print media sheet, comprising at least one substantially linear elongated illumination array of closely spaced multiple LED illumination sources of plural, different color emissions in a multiply repeated pattern. The spectrophotometer extends sufficiently in a linear dimension to transverse span a printer paper path to sequentially illuminate and receive light reflected from the transverse illuminated band extending across said print media sheet.

For scanner based offline measurements, U.S. Patent Publication 20040165199, by R. Victor Klassen, et al. (referenced above), shows a method to analyze the printed page to determine areas that qualify for further analysis and then use the scanned low-resolution image of the printed page and thereby obtain color differences for each pixel. As the inline sensor measurement is typically obtained from a region, it would be much easier to interpret the data if the image color in the region exhibits certain uniformity as noted above. The measurements are discarded and not used in estimation/calibration if they are obtained from a region where strong edges exist.

To properly characterize a printer during a calibration process often requires hundreds or even thousands of measurements, because the mapping function between the printer input and output (the color correction function) is usually very complex and difficult to model. However, recent investigation reveals that unlike the color correction function itself, the increment of the function caused by drift is very smooth and generally well-behaved. Also, U.S. Pat. No. 5,749,020 to L. K. Mestha et al., for "COORDINITIZATION OF THE TONE REPRODUCTION CURVE IN TERMS OF BASIS FUNCTIONS", proposed to approximate the TRC's with a few eigen functions. The results of a simulation, discussed below, show that each TRC can be well modeled accurately for xerographic engines—typically with no more than three eigen functions. It will be appreciated that various types of eigen functions may be employed, including: SVD. PCA, DCT, Fourier and Wavelets A total of approximately twelve parameters would be sufficient for specifying the color drift behavior of a printer. These parameters then require only about one to five (or fewer) times the same number of measurements for real time color correction updates. Ideally the system and method needs one measurement per parameter. However, the measurements might not be linearly independent, requiring additional measurements.

As briefly described above, and referring to FIG. 2, one embodiment of the method includes two phases, a training phase 210 and a calibration phase 220. The training phase 210 is required for creating basis vectors 212, $V(n,i)$. In order to characterize the basis vectors to cover an expected drift space, it is important to recreate the drift in a controlled environment. Note basis vectors that have been shown to be beneficial when used in this manner include Singular Value Decomposition (SVD) eigen functions, Principal Component Analysis (PCA) eigen functions, Discrete Cosine Transform (DCT) vectors, Fourier vectors, and Wavelets as well as other basis vectors.

Color drifts may be created in at least two ways: (i) by varying environmental conditions such as humidity/temperature by running print jobs in an environmental chamber, (ii) by manipulating the process control targets of the printing system (set points) so that colors are shifted or deviated from nominal operating setpoints and toward intended limits. Changing setpoints in the controlled environment is likely to be easier to accomplish. As an example of a setpoint change, the photoreceptor charge, laser power and donor bias voltages are common setpoints used for individual color separations in xerographic marking engines. It will be appreciated that alternative setpoints, or even alternative marking technologies may be employed, and that the training phase may apply to them as well.

One potential list of setpoints includes nine set points per separation, with each setpoint obtained for combinations of minimum, nominal and high values of at least three process actuators (e.g., photoreceptor charge, laser power, and donor voltage). The potential list of color sets, and their expected measurements with the inline spectrophotometer, include $13^3$ cyan (C), magenta (M) and yellow (Y) colors, with black (K)=0, and another 938 other combinations of CM, MY, YC, CMK, MYK . . . CMYK etc., colors. Thus a total of 3135 possible CMYK combinations can be used for the training phase. If one were to use LCLED inline sensors, then all of these colors could be measured on two-hundred eighty five pages, assuming eleven colors printed per page. Moreover, this process does not include any partial list of setpoints. It will be appreciated that a Taguchi-type "Design Of Experiments", may be an approach by which it is possible to reduce the number of offline experiments.

At the minimum, it was determined that about 36 experiments would be required, which amount to printing 10,260 pages. While this would not be impractical to perform in a controlled, laboratory-like environment, it was determined that by carefully selecting CMYK colors and the number of setpoint combinations, the total experimental time required for collecting data to characterize the eigen functions could be further reduced.

More specifically, consider forming a column vector with each column representing L*, a* and b* values of 3135 colors for a given experiment. Then the average color vector, $X_{mean}$, of each column is given by:

$$x_{mean} = \sum_{i=1}^{36} x_i \qquad \text{Eq. 1}$$

Let P be a matrix obtained with mean removed for each column containing L*, a* and b* values of 3135 colors of each experiment. Thus P will be a delta matrix of L*, a* and b* values with 3135×3 rows and 36 columns. Then the eigen functions are obtained as follows.

$$SVD(PP^T) = U\Sigma U^T \qquad \text{Eq. 2}$$

In Equation 2, the matrix U contains the eigen functions in columns described by the vector, V(n,i), where n=1, 2, 3, ..., 36. Eigen function V(n, i) is the component of the n-th eigen function for input colors indicated by parameter "i". The matrix Σ is diagonal and contains the square of the rank-ordered eigenvalues. Based on the eigenvalues in the Σ matrix, it is possible to determine the total number of eigen functions required for the vector, V(n,i).

As described above, the training phase 210 is likely to be performed offline. During training phase 210, the eigen functions of the color drift space are created from the measurement data. More specifically, the values of the eigen functions are stored in system memory for use in controlling the color system during printing operations.

In one embodiment, the total color drift is modeled as a linear combination of a few eigen functions. Specifically, for a given input color i, the output color drift vector Δo(k, i), at $k^{th}$ print, and estimated colors described by x(k, i) at $k^{th}$ print are given by:

$$\Delta o(k,i) = \Sigma_n \alpha(k,n) V(n,i) + e(k) \qquad \text{Eq. 3}$$

$$x(k,i) = \Delta o(k,i) + x_{mean}(i) \qquad \text{Eq. 4}$$

Where the summation is over all eigen functions (indexed by n), V(n, i) is the component of the $n^{th}$ eigen function for input colors i. The coefficients, α(k,n), is a model parameter estimated at $k^{th}$ print and e is the modeling and measurement error. In the training, the number and actual shape of the eigen functions are experimentally determined using singular value analysis for the expected drift space. The drift space is generally within the range at which the image output terminal or printer is expected to operate. Hence, it is not impractical to assume that the drift space is known and that its upper and lower bounds can be reproduced in the controlled environment by varying process setpoints.

Depending upon the printing system, with system being represented in terms of inputs and outputs, the input i, the drift Δo and the output x are represented in appropriate color spaces. For example, when the sensor is a spectrophotometer, the outputs are in device independent space, for example reflectance spectra/L*a*b*, obtained for input pixels when those input pixels are described in CMYK space. For such a system, i is represented in the CMYK space and Δo and x are represented in the reflectance spectra/L*a*b*. The vector, x(k, i), is the collection of measured quantities, reflectance spectra/L*a*b*, from the sensor at $k^{th}$ print. The vector, $x_{mean}$(i), represents the mean values of the measured quantities, reflectance spectra/L*a*b*, obtained during characterizing V(n, i) with offline experiments. We can also view the printing system as one with CMYK as outputs for corresponding CMYK inputs, when the spectrophotometer sensor has a conversion lookup table to transform the measured device independent measurements to CMYK values. Then the vector x(k, i) is the collection of measured quantities, output CMYK values, from the sensor. The vector, $x_{mean}$(i), becomes the mean values of the measured quantities, CMYK values, obtained during characterizing V(n, i) with offline experiments.

Figure 2:
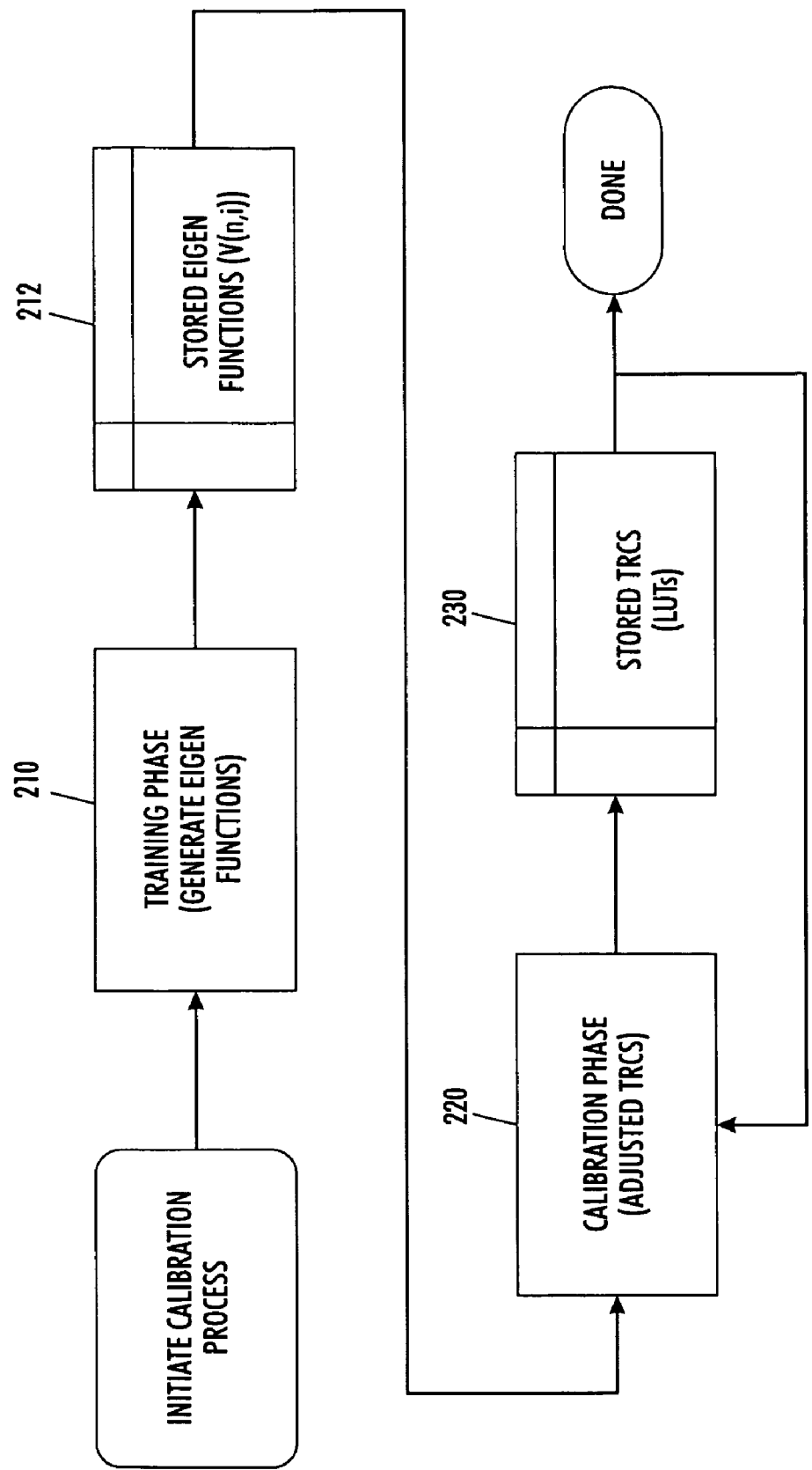
FIG. 2 is a general flow diagram illustrating aspects of the method disclosed in embodiments herein.

The calibration phase 220, in FIG. 2, is performed during the printing process. When a page is printed, the output is measured by a set of inline color sensors. The measurements are preferably sampled from the entire page when full width array sensors are used, although covering a smaller but significant portion or band of the page may be sufficient. The measured data obtained from the sensors are compared to the desired outputs. The discrepancy is used to estimate the model parameters. Notice that equation 4 is a classic linear regression model, and α(k, n) is easily estimated by a least squares method or by using the system identification approaches shown in control literatures (e.g., L. Ljung, "System Identification, Theory for User", Prentice-Hall, Inc., NJ 1987). Once model parameters are determined using incidental measurements, the color drift for the entire color space can be predicted with the following equations:

$$\Delta o^*(i) = \Sigma_n \alpha^*(k,n) V^*(n,i) \qquad \text{Eq. 5}$$

$$x^*(k,i) = \Delta o^*(k,i) + x^*_{mean}(i) \qquad \text{Eq. 6}$$

Where the superscript * denotes estimated/interpolated quantities at different regions of the color space, and depending on the look-up table (LUT) resolution obtained at regions other than those used while characterizing V(n, i) with offline experiments. The information is then used to update the previously generated profile LUTs (L*a*b*->CMYK). These LUTs are applied to adjust the color tables to compensate for the drift when preparing for the printing of the subsequent pages, and until another such update is called for. Equations 5-6 can also be used for creating updates for other color conversion models and/or parameters, such as TRCs, color conversion matrices. Although not specifically described, it is also possible that the calibration process is directed to the setting or adjustment of machine control parameters.

Figure 3:
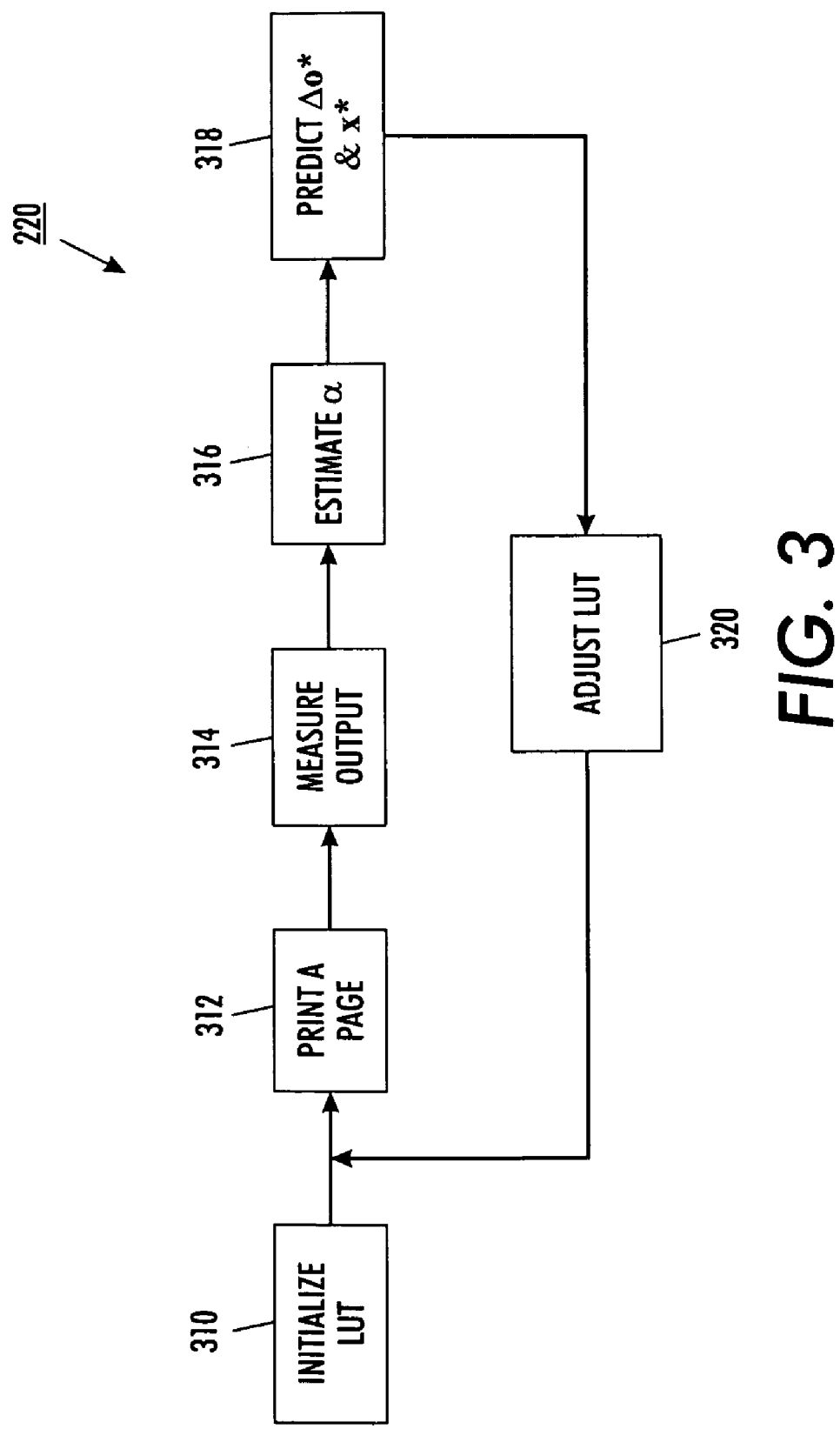
FIG. 3 is a flow diagram illustrating details of the calibration phase depicted in FIG. 2.

Referring also to FIG. 3, there is depicted an exemplary flow diagram illustrating several steps involved in the calibration phase 220. Specifically, at 310 the LUT values representing the TRC's 230 are initialized, stored in a system memory (e.g., RAM) and used to print or render the page as represented by 312. As described above, the output page is measured using the afore-described sensors, at step 314. The results of the measurement step are then passed (perhaps having been temporarily stored in memory), to a processor and the processor employs the measurements, using the eigen functions previously characterized, to estimate a (step 316) and predict Δo* and x* (step 318). Based upon the predicted drift, determined using the eigen functions, the look-up tables are then adjusted at 320. It should be appreciated that the method depicted in FIG. 3 may employ, prior to step 320, one or more thresholds or other test to determine whether the predicted drift is at a level requiring adjustment. In other words, from a process control perspective, adjustments to the system may be made only when the drift exceeds an acceptable tolerance or range from a prior level.

Although the system as disclosed herein was modeled as a linear combination of the eigen functions, the description presented herein is not intended to exclude other methods of modeling. For example, it is further contemplated that $\Delta o$ (i) may also be represented with a polynomial function. The polynomial coefficients and hence $\Delta o^*$ (i) can be estimated from the measurement samples.

Having described the general steps employed relative to the calibration phase, attention is turned to an illustrative example of the manner in which the color adjustment to the LUTs is computed using the drift vector $\Delta o^*$. Specifically, the example describes a method to adjust the profile LUT: $L^*a^*b^*$ to CMYK.

Since eigen functions for various values of n, and color space pairs CMYK(input to the printer)->$L^*a^*b^*$(sensor output) & CMYK(input to the printer)->CMYK(sensor output) are available in the memory (210 in FIG. 2), and the corresponding coefficients a(k, n) are obtained using the image data in real time, Equations 5-6 can be easily computed to obtain the drift vector in the correct space. For example, to adjust the $L^*a^*b^*$ to CMYK LUT, one would need the $\Delta o^*(i,)$ computed with eigen functions with CMYK->CMYK space. For simplicity, call this $\Delta o^*(i)=\Delta o_{CMYK}$. Let s be the output values of the $L^*a^*b^*$->CMYK LUT. To compensate the color drift, for every entry in the table, the CMYK values, s, is revised to $s-\Delta o_{CMYK}(s)$.

This method of adjustment can be justified as follows: suppose color values s are sent to the print engine, the ideal output would be $o_{CMYK}(s)=s$. But, with the color drift, the actual output becomes $o'_{CMYK}(s)=o_{CMYK}(s)+\Delta o_{CMYK}(s)$. If the drift is small (say less than 10 deltaE), an assumption, and if the color values s is revised to $s-\Delta o_{CMYK}(s)$, the resulting output is then $o'_{CMYK}[s-\Delta o_{CMYK}(s)]=o_{CMYK}[s-\Delta o_{CMYK}(s)]+\Delta o_{CMYK}[s-\Delta o_{CMYK}(s)]$. Noticing $o_{CMYK}[s-\Delta o_{CMYK}(x)]=s-\Delta o_{CMYK}(s)$, and approximating $\Delta o_{CMYK}[s-\Delta o_{CMYK}(s)]$ with $\Delta o_{CMYK}(s)$ (ignoring the second order error), one obtains $o'_{CMYK}[s-\Delta o_{CMYK}(s)]\approx s-\Delta o_{CMYK}(s)+\Delta o_{CMYK}(s)]=s$. Hence, the drift in output is compensated.

As described above the system and method permit building and updating (dynamically, during printing operations) of color correction LUTs using information from incidental test patch areas of an image. The disclosed embodiments employ a low-rank approximation method, via rank-reduced printer, with eigen/basis functions obtained apriori with offline drift tests, for example, process setpoint adjustments. Moreover, the disclosed method does not require the use of test patches representing particular point/regions of the color space. Rather, as a result of the use of eigen functions, measurements can be made on incidental patches located anywhere in the color space. Hence, the disclosed method reduces the number of measurements required to maintain the calibration of a print engine, and permits efficient use of any incidental patch area for calculating updates required for LUTs.

In a general sense, the method employs basic decomposition of the printer drift space in terms of eigen functions and its efficient use for color control during continuous print runs. As inline color sensors (e.g., spot, partial, full width) are developed for full speed, continuous in-situ measurements, the disclosed methods and system become increasingly useful. Accordingly, the application of eigen/basis functions for drift space characterization facilitates their extensive use in color controls to maintain color consistency for every page during continuous run of a print job(s). The use of such basis functions, at such a fundamental level, might also enable further process controls not expressly set forth herein.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for image based control of a printing device, comprising:
    a training process, wherein a total color drift is modeled; and
    using the color drift modeled in said training process performing a calibration process continuously during completion of a printing job based upon measurements obtained from sensors operatively associated with the output device.

2. The method of claim 1, wherein said color drift is modeled as a low-rank approximation.

3. The method of claim 1, where the low rank approximation is characterized using a plurality of eigen functions.

4. The method of claim 3, wherein the eigen functions are of a type selected from the group consisting of: principal component analysis eigen functions, discrete cosine transform vectors, Fourier vectors, and Wavelets.

5. The method of claim 1, wherein the calibration process is performed continuously using an image being printed as a normal output of the printing job.

6. The method of claim 1, further including producing a low-rank approximation model of the color drift, wherein the calibration process employs measurements made from incidental patch areas in the printed image as data points and where the data points and model are used to generate adjusted settings for the output device.

7. The method of claim 6, wherein the training process occurs offline and the adjusted settings are used to dynamically control the output of the printing job.

8. A method for controlling performance of an image output device, comprising:
    characterizing the variability of the image output device in terms of a model;
    periodically collecting data relating to a current state of the image output device; and
    applying the data to the model to determine an adjustment to be made to the image output device.

9. The method of claim 8, wherein the model employs a low-rank approximation method.

10. The method of claim 9, wherein the low-rank approximation is represented by a plurality of eigen functions.

11. The method of claim 10, wherein the eigen functions are of a type selected from the group consisting of: principal component analysis eigen functions, discrete cosine transform vectors, Fourier vectors, and Wavelets.

12. The method of claim 11 wherein the step of periodically collecting data includes sensing colors of incidental patches on output documents during a print job, wherein the colors are distributed within a color space.

13. The method of claim 9, wherein applying the data to the model to determine an adjustment comprises calculating updates required for look-up tables employed by the image output device.

14. The method of claim 9 wherein periodically collecting data comprises full-speed, continuous in-situ measurements of colorimetric data.

15. The method of claim 9, where characterizing the variability of the image output device comprises decomposition of the printer drift space.

16. A system for image based color calibration, comprising:
- an image output device for rendering printed color documents in response to digital image data an initial configuration as processed by a digital front end processor operatively connected to the system;
- a memory for storing information characterizing the performance of the image output device;
- a color sensor suitable for detecting a color of an image deposited on the printed color documents and producing an output indicative of the color; and
- a calibration processor for receiving the output indicative of the color and, in conjunction with the information characterizing the performance of the image output device, producing a modified configuration for subsequent use in rendering the printed color documents.

17. The system of claim 16, wherein the information characterizing the performance of the image output device is a low-rank approximation based upon eigen functions, said functions being stored in the memory.

18. The system of claim 17, wherein the initial configuration is at least partially determined by a look-up table and where the look-up table is modified as a result of the eigen functions.

19. The system of claim 18, wherein the look-up table is stored in the memory.

20. The system of claim 16, wherein said color sensor includes non-contact, on-line spectrophotometer color measurement positioned in an output path of a color printer.

* * * * *